A. F. COMINGS.
Attachment for Sewing-Machines.
No. 130,021. Patented July 30, 1872.
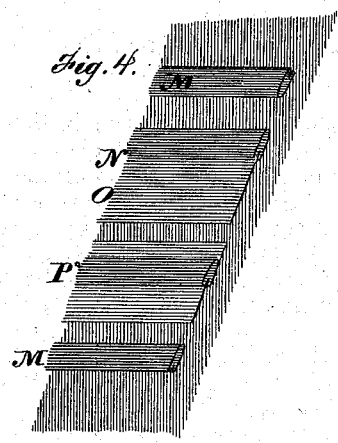
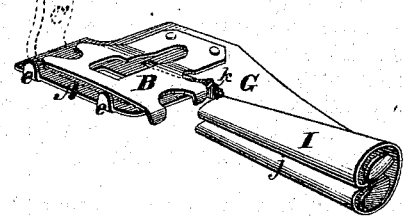
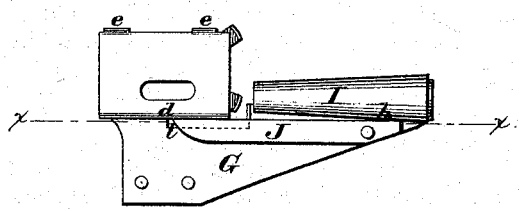
Witnesses.
C. F. Brown
M. Church
Inventor:
Arthur F. Comings,
by his Attys.
Hill & Ellsworth

UNITED STATES PATENT OFFICE.

ARTHUR F. COMINGS, OF CHICAGO, ILLINOIS.

IMPROVEMENT IN ATTACHMENTS FOR SEWING-MACHINES.

Specification forming part of Letters Patent No. 130,021, dated July 30, 1872.

*To all whom it may concern:*

Be it known that I, ARTHUR F. COMINGS, of Chicago, in the county of Cook and State of Illinois, have invented a new and Improved French-Trimming Attachment for Sewing-Machines; and I do hereby declare the following to be a full, clear, and exact description of the same, reference being had to the accompanying drawing forming part of this specification, in which—

Figure 1 is a perspective view of the trimmer applied to the presser-foot of a sewing-machine. Fig. 2 is a bottom-plan view of the same detached from the presser-foot. Fig. 3 is a longitudinal section through the line $x\,x$, Fig. 2; and Fig. 4 represents different forms of the French trimming applied to a piece of cloth.

Similar letters of reference in the accompanying drawing indicate the same parts.

My invention has for its object to provide an improved attachment for the presser-foot of a sewing-machine, whereby the article of trimming for dresses, &c., known as "French folds" can be formed and sewed upon the goods, at any distance from the edge thereof, at one operation. It also has for a further object the turning of a heading or any kind of trimming and stitching both trimming and heading upon the goods any desired distance from the edge thereof at one operation. To the accomplishment of these results, the invention consists, first, in adapting the device employed for attaching a ruffler to the presser-foot of a sewing-machine, as shown in the patents granted to A. M. Leslie May 31, 1870, and October 18, 1870, to receive the folding or trimming attachment. It consists, secondly, in combining a spring-guide with the trimmer for the purpose of guiding the fold to the needle and to adapt the trimmer for use upon all classes of machines having either a high or low feed.

In the accompanying drawing, A is the bottom or base plate of the trimmer, and B the top plate, the two being secured together at or near the inner edge so as to leave a space between them for the reception of the presser-foot C of a sewing-machine. The plates are held upon the presser-foot by the elasticity of the top plate and prevented from lateral displacement by the shoulder $d$ and lugs $e$ upon the base-plate. The base-plate is further formed with a lateral wing, G, extending to the front of the attachment, where its turned-up edge $h$ receives the folder I, so that the latter shall occupy a position in line with and directly in front of the plates A B. The folder is composed of a single plate of metal bent laterally upon itself so as to form a longitudinal channel, $j$, centrally between the two turned edges and a funnel-shaped tube above and below said channel. The smaller end of the folder terminates in front of the base-plate, which is turned up to permit the free passage of the fold, trimming, &c., from the folder to the needle. J is the spring-guide, composed of a narrow strip of metal and secured at its rear end to the under side of the plate G, next the folder. Its free end extends forward beyond the end of the folder, where it is rounded somewhat to prevent it from catching in the cloth, and formed with a flange, $k$, which projects upward through a slot, $l$, made in the base-plate, as shown.

The trimmer being attached to the presser-foot of a sewing-machine, as above described, the operation is as follows: A strip of the requisite width for forming a bias or straight fold is first inserted in the folder with its edges turned toward each other. As it is drawn through the folder it passes under the base-plate to the needle, resting upon the goods to be trimmed, and is fed forward with the latter after the two have been stitched together. The fold is guided to the needle by the spring-guide J, and its width is equal to the distance between such guide and the outer curvatures of the folder at the discharge-end. The position of the folder with respect to the needle or needle-holes in the attachment is such that the folds are stitched to the cloth along their turned-in edges, as shown in Fig. 4, this being the characteristic of the trimming known as "French folds." Inasmuch as the device is fastened to the presser-foot of the machine and clear of the bed-plate, the goods pass readily beneath it, and admit of the folds being applied thereto at any distance from the edge and to any given place or pattern marked thereon, as in the trimming of dress-skirts, putting headings over flounces, lace, or bias folds in the middle of the skirt, &c. The rounded point prevents the spring-guide from catching in the goods when the latter is turned in following a pattern, &c.

M, Fig. 4, represents a fold applied directly to the cloth, and N a heading turned over a piece of trimming. In this latter method of applying the fold the edges of the trimming O are placed together within the channel of the folder, and the fold, as it leaves the latter, is turned in upon each side of such edges and stitched thereto and to the goods at one operation. P shows a still further modification, in which the fold is applied to the edge of a piece of trimming, such edge passing within the channel and the opposite edge passing with the cloth beneath the folder.

The feed on different sewing-machines does not rise in the bed-plate to the same height, so that while a fixed guide for the fold would operate upon one it would not upon another. To overcome this difficulty I employ the spring-guide with an upturned flange, as above described, which shall adapt itself to the difference in feed and render the trimmer applicable to all classes of machines.

By my invention an attachment for sewing-machines is produced capable of making and stitching upon cloth, &c., many kinds of folds and trimmings employed for ornamenting dresses and garments of all descriptions.

Having thus described my invention, what I claim is—

1. The spring-guide J k, in combination with the folder I, substantially as described, and for the purposes specified.

2. In combination with the folder I and attachment A B, the spring-guide J k, substantially as described, for the purpose specified.

Witnesses: ARTHUR F. COMINGS.
J. E. TRIMBLER,
F. I. WILSON.